Dec. 9, 1941.   C. L. STRAUB   2,265,677
FUEL INJECTION, COMPRESSION IGNITION, OIL ENGINE
Filed March 24, 1939   2 Sheets-Sheet 1

Constantine Lee Straub
INVENTOR.

Constantine L. Straub
INVENTOR.

Patented Dec. 9, 1941

2,265,677

UNITED STATES PATENT OFFICE 2,265,677

FUEL INJECTION, COMPRESSION IGNITION, OIL ENGINE

Constantine Lee Straub, Berkeley, Calif., assignor to Robert W. Baird, Milwaukee, Wis.

Application March 24, 1939, Serial No. 263,885

10 Claims. (Cl. 123—55)

This invention relates to oil burning engines, and while of notable utility when employed in two stroke cycle, multi-cylinder, fuel injection, compression ignition engines, it will be understood that I contemplate the utilization of my improvements in any field to which they are adapted by their nature.

The compression ignition, or Diesel cycle in oil engines is inherently a slow speed cycle wherein, during a definitely limited arc of crankpin travel, the entire process of fuel injection, atomization, gasification, admixture with oxygen contained in the highly compressed air, and consequent combustion must take place.

This crank arc angle is limited, in any speed of rotation of the crankshaft, in the initial point of fuel injection, by the pre-ignition tendency of the fuel used and in the terminating point of fuel injection, by the specific facilities provided to insure proper combustion of the injected fuel and subsequent economic expansion of the heat thereby generated.

One of the objects of this invention is to provide means to economically operate a two stroke cycle, compression ignition oil engine at relatively high rotative speeds. These means comprise exhaust ports of ample area and with a sufficient crank arc angle of opening period to assure complete expansion of the heat generated by the combustion and to also provide sufficient time and area of port opening to efficiently exhaust the products of combustion. These means also include inlet ports whose open period includes a greater crank arc angle than said exhaust ports, and through which the flow of previously compressed air is mechanically controlled and by which means, air at proper pressure can continue to be forced into the engine cylinder after the exhaust ports have been closed.

These means also include provisions to thoroughly mix the air and fuel during and after the fuel injection period and comprise inlet port bridges that direct the inflowing air charge tangentially into the cylinder, providing thereby a swirling action around the major axis of the cylinder and therewith, facilities provided by the dual concave surfaces of the combustion chamber whereby the swirling air charge from the cylinder is forced at high velocity into the spherical or cylindrical combustion chamber and directed tangentially around the axis of said chamber and at an angle to the major axis of the main cylinder, whereby, a dual spinning or swirling action is impressed upon the highly compressed air, into which the fuel is then injected.

These means also include the employment of a combustion chamber whose interior surfaces or walls are uncooled by direct contact with the water jacket wall, whereby, these walls become highly heated and together with the high temperature of the air compressed into the combustion chamber, the thorough elimination of products of combustion, the provision of a full cylinder of air, the active, dual turbulent mixture of compressed air and atomized fuel in the combustion chamber, make possible prompt combustion, economy and high rotative speeds.

These means also include spinning of the air charge in the engine cylinder and in the combustion chambers, where the combination of high turbulence or swirl, with the highly heated combustion chamber walls (sometimes referred to as a heat reservoir) serve to force a more intimate fuel-air admixture and prompt ignition and more complete combustion.

Among other early oil engine inventors, I have long recognized the necessty of turbulence and heat to assist fuel-air admixture and subsequent combustion. U. S. Patent 720,752, granted to me in 1903, disclosed definite provision for spinning the incoming air by the tangential location by the scavenging air ports and provided a narrow throated spherical combustion chamber into which the air charge was spun and whose highly heated walls, combined with the heat of compression of the swirling air charge, produced prompt and efficient combustion at crankshaft rotative speeds considered high at that time.

The two stroke or clerk cycle, in which only two strokes of the piston are required to complete one cycle of operation, is readily adapted to high speed, fuel injection, compression ignition construction. The employment of this cycle of operation has become almost universal among builders of large, slow speed oil engines and to some extent, by builders of higher speed automotive units.

One of the principal handicaps in the high speed, two stroke cycle oil engine, is the difficulty in obtaining complete scavenging of the products of combustion residual in the cylinder from the previous cycle and substituting therefor a full cylinder of fresh air, unadulterated with combustion products for the succeeding cycle.

Inventors have employed numerous means in endeavouring to secure these objectives in two stroke cycle engine designs. Some have two pistons oppositely reciprocating, operating in a common cylinder with exhaust ports and inlet ports circumferentially disposed in the cylinder, one group in one end and the other group in the opposite end of the cylinder barrel and both uncovered by the piston heads at or near the termination of their respective outward or crank strokes, thus providing a uniflow of exhausted gases and incoming air.

Other "uniflow" systems employ wall ports in the lower or crank end portion of the cylinder and valves in the head of said cylinder. Some employ the ports for the admission of scavenging pressure air and the head valves for the exhaust of the products of combustion; while others reverse this process and admit pressure air through the head valves while exhausting the combustion products through the ports at the lower portion of the cylinder, when they are uncovered by the piston.

Still others, employing a single piston per cylinder in the two stroke cycle, resort entirely to the uses of ports for exhausting combustion products and for the admission of fresh air. The pressure of the expanding gases within the cylinder, as the piston approaches the termination of its expansion stroke, is such that without control means, the inlet port must, of necessity, be opened a sufficient period of time after the exhaust port opening, to permit the expanding exhaust gas pressure to drop to a value equal to, or preferably, lower than, the pressure of the incoming fresh air. Such an arrangement of ports without control means, obviously restricts the inlet port opening to a lesser crank angle than the exhaust port opening and precludes supercharging the cylinders with fresh air at the moment of port closure.

In order to surmount the above difficulty, inventors have employed dual inlet ports, one superimposed above the other on one side of the cylinder wall and a single exhaust port in the opposite wall of the cylinder. The upper of these dual inlet ports, located on a plane above the exhaust port, is customarily fitted with one or more automatic, spring operated, valves which are held closed by the pressure within the cylinder until the exhaust port discharge has lowered the cylinder pressure below the scavenging air pressure, at which time the scavenging air pressure opens said inlet valve, or valves, following which the air flows through both inlet ports to displace the balance of the products of combustion.

If supplied with air of sufficient volume and pressure, the upper inlet port will permit the passage of sufficient additional air after exhaust port closure to build up a plus atmospheric pressure or supercharge. Such automatic spring valve controlled ports are limited to engines of relatively slow rotative speeds, as the inertias of the valves themselves require measurable time for opening and closure, and such mechanisms are unsuited for the relatively higher rotative speeds required in portable and automotive engines.

In two stroke cycle engines, it is desirable, in order to obtain maximum power and efficiency, to expand the heated gases of combustion to the lowest economic pressure before exhausting the same to the atmosphere and to replace the products of combustion residual in the cylinder at the completion of the piston expansion stroke, with pure air, and also in order to obtain a maximum yield of power per cubic inch of piston displacement, to thereafter force into the cylinder, additional air at a pressure to create a supercharge of air at the moment of port closure.

One of the objects of my invention is to provide means, whereby the admission of any fresh, cool air into the cylinder may be delayed until the pressure and temperature of the expanding gases of combustion shall have been reduced to the lowest values consistent with economy, thereby, assuring the greatest possible conversion of heat energy to work and thereafter to displace the residual products of combustion with a sufficient quantity of pure air and at the required pressure, to assure a full cylinder of unadulterated air at atmospheric or plus-atmospheric pressure at the time of port closure.

Such means include not only exhaust and inlet port areas of large proportions, but also inlet ports with their upper edge planes, located above the opening edge planes of the exhaust ports and said inlet ports equipped with mechanically operated valves which are closed to prohibit the passage of gases or of products of combustion or of cool fresh air, until the pressure of the expanding gases within the cylinder shall have been reduced to economic values, and thereafter the inlet port and its mechanically operated valve is opened, admitting fresh air at pressure into the cylinder until after the closure of the exhaust ports. The areas of both ports and their heights above the plane of the piston top, when the latter is at the end of its crank stroke, together with the volume and pressure of the air supply, control the maximum rotative speed and power output of the engine.

Another object of my invention is to provide positive, mechanically operated inlet port valves of simple construction and of large volumetric capacity, to definitely prohibit the back flow of products of combustion from within the engine cylinder into the scavenging air manifold or the inflow of cooling air into cylinder until the heat expansion is economically completed, and to thereafter permit the flow of said fresh air, with a minimum of impedance, into the engine cylinder in volume sufficient to displace the residual products of combustion and provide sufficient supercharge at the moment of port closure so as to insure a full cylinder of unadulterated air for the next cycle of operation.

Another object of this invention, is the provision of means to produce active turbulence of the air charge in both cylinder and combustion chamber to assure competent admixture of the air-fuel charge and its complete combustion in the limited time available. These means include turbine shaped inlet port bridges and passageways which, together with the shaped piston crown, guide the inrushing scavenging air tangentially and upwardly into the cylinder barrel. This cylindrical air column, actively spinning about a vertical axis, is forced into a spherical or cylindrical combustion chamber, the concave walls of which are formed partly by the cylinder head, and partly by the piston head, and both so arranged with reference to each other, that as the velocity of the piston slows to a stop at the end of the outward or compression stroke, the aperture into the combustion chamber proportionately closes to insure a high velocity of the spinning air charge as it is forced tangentially into the combustion chamber and swirls about its axis. The heat residual in the uninsulated walls of the combustion chamber, combine with the heat of the compressed air charge to instantly ignite the injected fuel, the complete and prompt combustion of which is effected by the violent and dual spinning or swirl of the air charge above described.

Another object of my invention is the employment of a high turbulence combustion chamber, which is formed in part from the concave air deflector surface of the piston head and partly by a concave recess in the head of the engine cylinder, and which chamber, by its construction of one stationary and one movable member provides facilities for the complete elimination of products of combustion from the chamber each stroke of the piston, whereby prompt and efficient combustion of the injected fuel is assured and by reason of the high turbulence of the air-fuel mixture within the combustion chamber at the time the fuel is injected, intimate admixture of air and fuel is provided, contributing greatly to the development of maximum power.

Another object of my invention is to provide exhaust and inlet ports of such height and area as will provide both the time and volumetric efficiency required for the efficient displacement of both exhaust and inlet gases at the designed speeds of rotation. It will be evident that ports of such maximum areas will of necessity almost circumscribe the cylinder periphery and thereby affect the structural strength of the cylinder wall. Such gas ports require bridges, or bars of metal, integral with the cylinder walls to prevent the expansion of the piston rings into the port openings. I have found that such bridges, if made of sufficient depth, and if extended deeply through the gas passageways, and also if extended into the water jacket areas surrounding the cylinder above and below the port levels and formed integral with both the cylinder and water jacket barrels, and with proper provision supplied therewith for the circulation of cooling water, provide not only ample longitudinal and lateral strength to sustain the high stresses of Diesel cycle operation, but also act as cooling fins to convect the otherwise destructively high temperatures away from the port bridges and into the surrounding water jacket.

In engines of this type, applied principally to automotive or similar work, space limitations dictate structural means which, ordinarily, are not imposed upon the designer for other classes of service. It is preferable, in order to accommodate the limitations for automotive service, to use multiple cylinder engines and preferably in so called V type units, wherein each adjoining pair of cylinders have pistons connecting with a single crank pin. Obviously, the arrangement of crank pins with reference to each other is a function of the numbers of pairs of such cylinders adopted for the particular service.

I have found that in the V type construction, multiples of pairs of cylinders, each pair being connected to a common crank pin, can be made in units of 2—4—6—8—10 or 12 cylinders as the power requirements may be, and for the purpose of this description have shown only one such pair of cylinders, together with their respective pistons, connecting rods and single crank pin, and while this arrangement is effective for the class of work above described, it will be understood that I do not limit the applications of this invention to any number of pairs of cylinders, or to groups of cylinders articulated about a single crank pin. In other words, this invention may be applied to engines of the so-called radial type, in which a number of cylinders are grouped about a common center line, each functioning on a single common crank pin, or there may be groups or pairs of cylinders operating on separate crank pins in so called V or W types of construction.

The various features of my invention are illustrated and described in the accompanying drawings and specifications:

Figure 1 of these drawings illustrates a pair of cylinders with their respective pistons, connecting rods and crank pin on a common plane.

In all three views the same letters designate the same parts and mechanisms.

Figure 1:
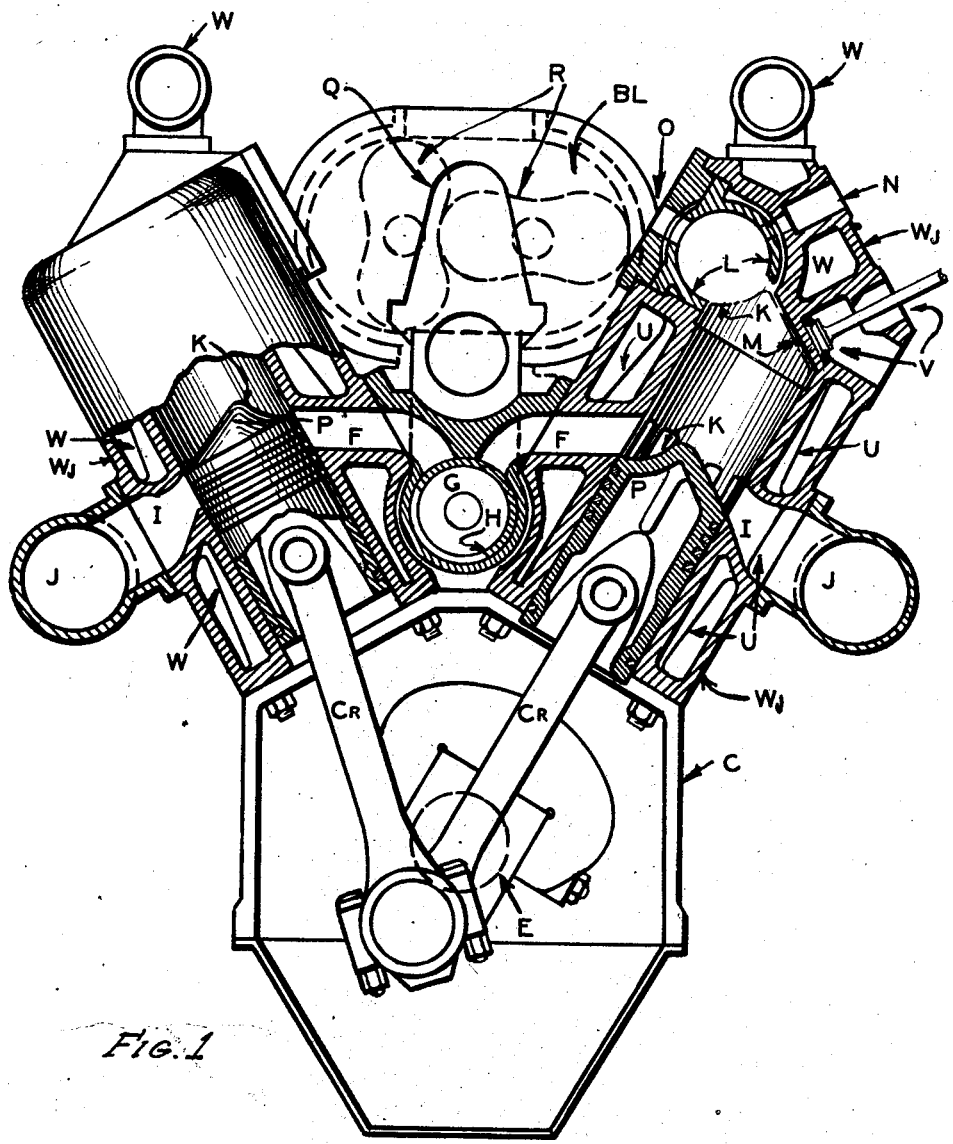
Figure 3:
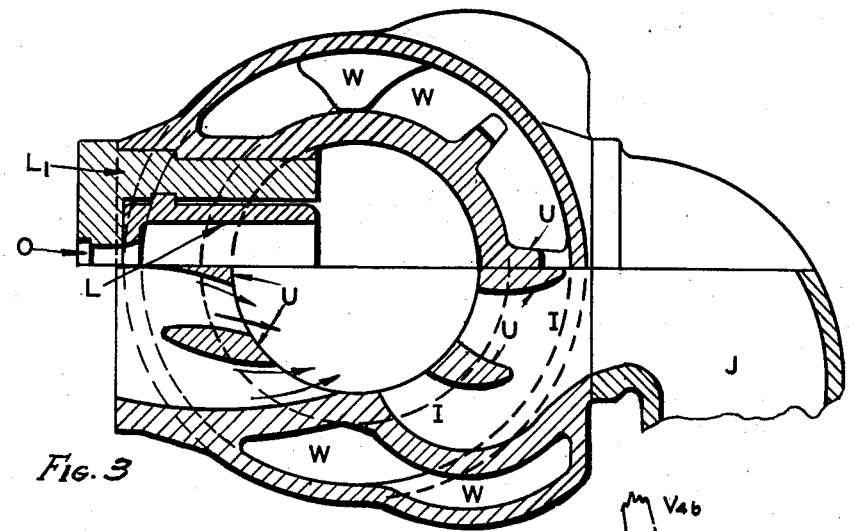
Figure 3 shows horizontal sections through such a cylinder.
Figure 2:
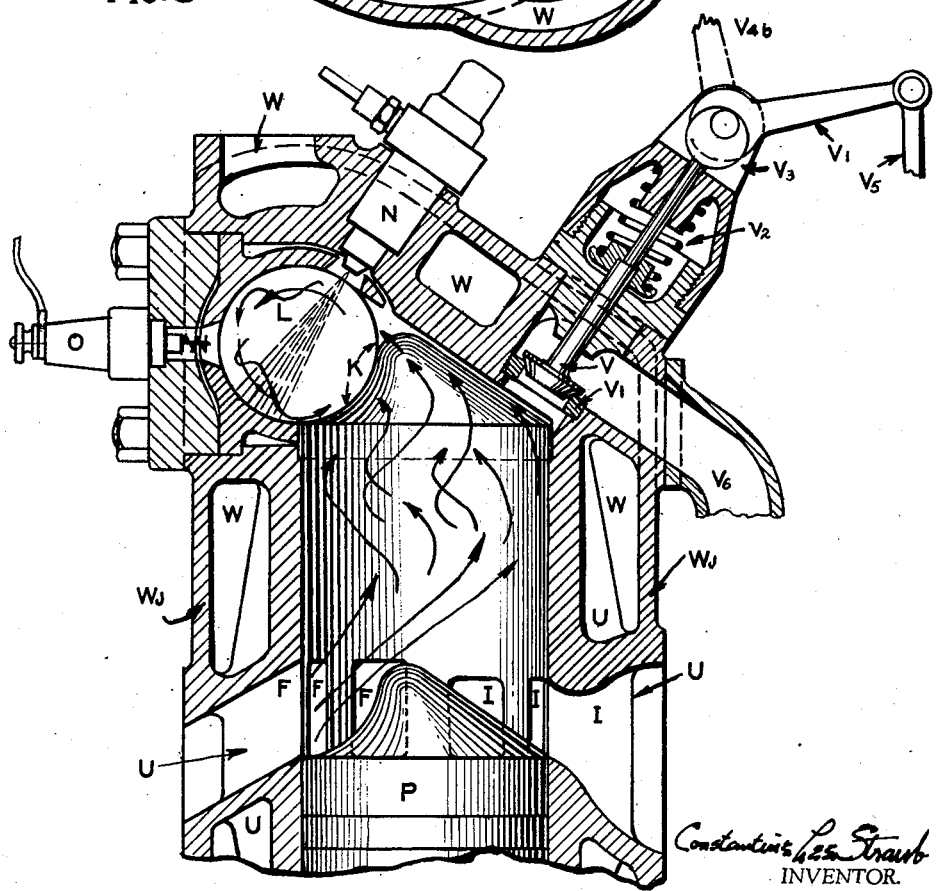
Figure 2 shows an enlarged sectional elevation of a portion of one of such cylinders.

Letter "C" indicates the crank case, on which the cylinder or cylinders are mounted.

Letter "E" indicates the crank shaft.

Letter "Cr" represents the connecting rods of the respective cylinders.

Letter "P" represents the piston.

Letter "Cyl" represents the cylinders.

Letter "W" represents the water space between the interior of the cylinder and the water jacket "Wj."

Letter "L" represents the combustion chamber.

Letter "Wp" represents the water pipe.

Letter "Bl" represents the air compressor or blower, which, in this instance, shows diagrammatically a Roots type of displacement blower.

Letter "I" represents exhaust ports connecting from the interior of the cylinders to the exhaust manifold "J."

Letter "U" represents bridges interposed between the respective ports and extended above and below the port planes into the water spaces between the cylinder walls and the water jacket walls.

Letter "G" shows a cylindrical, pressure air manifold, connecting from the discharge of the Roots type blower to the inlet ports F of the respective cylinders.

Letter "H" shows a tubular valve revolving inside the cylindrical air manifold G and having a single port aperture connecting respectively with the cylinder inlet passageways, leading from the air pressure manifold G to the inlet ports F of each cylinder; the rotating valve H, being driven by any common means from the crank shaft E and at the same speed as the latter, the single port opening of the rotating valve H being fashioned to identically serve both cylinders whose respective pistons are connected to a common crank pin, wherein air of prearranged pressure and volume is admitted to the air ports of each cylinder at the identical position of crank pin travel with relation to the respective cylinders.

Letter "N" shows the location for the fuel oil injector valve.

The valve V, and its several members, serve as a manually controlled compression release valve and is interconnected with the high pressure fuel injection system as to be inoperative when the fuel injection system is operating and vice-versa.

A fuel injection pump is shown diagrammatically at Q.

Letter "R" represents the rotating impellers in the Roots blower Bl.

Letter "O" represents the location of an electrical heating element, sometimes referred to as a "glow-plug," which is occasionally used to expedite starting the engine in very cold weather.

The compression release valve V comprises parts V1, an inserted valve seat; V2, a spring arrangement to hold the valve V on its seat normally; an eccentric or cam V3 to manually secure the valve V on its seat V1; a crank, or lever, V4 arranged with a controlling rod V5 manually operated between the positions V4 and V4b whereby the operator may hold the valve V fixed to its seat, or may, by placing this lever in the position V4b, remove the cam or eccentric from the contact with the stem of the valve V, whereby it may function as a compression release valve; the pipe, V6, thereafter carrying the discharged compressed air away from the cylinder of the engine.

In the beginning of the operation of this engine, the crank shaft E is rotated by any of the well known means customarily provided for that purpose; an electric motor operated from a storage battery being the common means, whereby air residual in the interior of the cylinder is compressed by the movement of the piston toward the cylinder head. The electric "glow-plug" O previously having been heated by the closing of the electric circuit with the storage battery, the air at high compression is forced tangentially into the combustion chamber L, the head of the piston P being fashioned with a concave surface at K and a plane surface on the side of the head, indicated at M, is so arranged that as the head of the piston P approaches the cylinder head at and toward the end of its outward or compression stroke, the plane surface M of the piston drives the air into the combustion chamber L and tangentially directs the air therein at increasing velocities, whereby the air is rapidly rotated within such combustion chamber and at the end of the compression stroke that portion of the head of the piston shown at K serves as a part of the interior concave wall of the combustion chamber L, and whereby practically all of the air originally residual within the cylinder has been so forced into the combustion chamber L in which it is rotated at relatively high speed, the compression pressure of this air is sufficiently high to produce a temperature above the ignition temperature of the fuel oil.

At or near the end of the compression stroke, fuel oil, in metered quantity and at proper pressure, is injected through valve N in an atomized condition into this highly heated, swirling air charge within the combustion chamber walls. The atomized fuel oil is projected into and across the swirling air charge, passing through it twice, whereby the fuel oil is gasified and thoroughly mixed with the swirling air charge. The dual spinning action of highly heated, compressed air, within the combustion chamber, together with dual penetration of the spinning air by the injected fuel charge, provides instant ignition, elimination of stratification of the air-fuel charge and complete combustion.

The piston now having passed the top dead center, the expansion of the heat generated now takes place and as the piston approaches the crank end of the cylinder, it uncovers first the inlet air ports, the upper edges of which are placed at a higher plane than are the upper edges of the exhaust ports, the aperture in the rotating air control valve H, however, being closed to the inlet port F, the pressure of the expanding charge within the cylinder walls cannot flow back into the air manifold G and thereafter as the piston uncovers the exhaust ports the pressure within the cylinder is exhausted into the exhaust manifold J and at a suitable moment, determined by the location of the aperture in rotating air valve H, when the pressure within the cylinder has dropped to a point below the pressure of the air within the air manifold G, the rotating valve H uncovers the aperture F leading to the inlet ports and high pressure air supplied by the blower B1 flows into the cylinder and is deflected by the turbine blade shapes of the inlet port bridges U and by the concave surface K of the piston, so that the inrushing air is directed both upwardly into the cylinder and tangentially around the major axis of the cylinder, thereby producing the dual service of displacing the balance of the products of combustion within the interior of the cylinder and combustion chamber and at the same time, imposing a swirling motion upon the air included within the cylinder walls, to assist in the combustion of the fuel in the succeeding cycle. The withdrawal of the piston and its concave surface K from the combustion chamber L provides a sufficiently large aperture in the latter, whereby the upwardly directed air charge from the piston surface K permits the directed flow of the incoming air charge in such a manner as to thoroughly clear the combustion chamber L of products of combustion residual from its previous cycle.

In order to obtain a maximum expansion of heat and thereby its conversion into the maximum amount of work in heat engines of this character it is necessary to preclude the possibility of chilling the expanding heat charge by the premature admission of relatively cool air into the cylinder volume. This is accomplished by maintaining in a closed position, the aperture in the rotating air control valve H until the economic expansion of the heat generated by the fuel-air combustion, has been effected. The aperture in valve H is so fashioned that it remains wide open to the air port passage F once having been opened mechanically until the piston surface K itself closes the air port F, when aperture H is mechanically closed, whereby a maximum quantity of air may be introduced into the cylinder, and this is insured by the fact that the upper edge of the piston on its outward or compression stroke, having first closed the exhaust ports, air at greater than atmospheric pressure will continue to flow into the cylinder after the exhaust ports have been closed, thereby producing what is conventionally known as a supercharge of air.

It will be seen from this arrangement that air of requisite pressure and volume may be forced into the cylinder of the engine in order to first insure a thorough scavenging of all products of combustion from the previous cycle of operation and that this air will be spinning or swirling about the major axis of the cylinder at the time both exhaust and inlet ports are closed by the piston on its outward or compression stroke and that thereafter this spinning or swirling charge of air within the cylinder will be driven into the combustion chamber and around its axis, which axis preferably will be at an angle to the major axis of the cylinder and is shown on the drawings at 90 degrees to the major axis of the cylinder, whereby a dual swirling action will be had within the combustion chamber; one motion of this swirling or spinning air being about the axis of the combustion chamber itself, and the other at an angle to the axis of the combustion chamber, thus making possible a dual turbulent mixture of the air and the injected fuel charge, whereby stratification of the air fuel charge is eliminated and thorough mixing and complete combustion is effected.

The heat absorbed by the bridges of both inlet and exhaust ports shown at U is largely convected into the cooling water surrounding the cylinder wall by the extended ribs or bridge sections above and below the levels of the inlet and exhaust ports and these extended ribs, or bridges, also serve to restore to the cylinder wall itself some of the structural strength which is removed by the exhaust and inlet port apertures bisecting the cylinder walls. Practice has shown that this construction provides safe and permanent port bridges.

While I have shown a Roots type of blower as preferable for the air supply of this class of combustion ignition engine, may it be understood that I do not limit the invention to this single method of supplying combustion air under pressure for this work. There are many other methods commonly used for supplying air in proper quantity and at desirable pressures for such service.

In automotive service, the compression ignition engine normally operating without the service of the ordinary throttle valve or means to restrict the flow of air into the cylinders, when coasting or descending grades, the operator is compelled to depend almost exclusively upon mechanical brakes of one or another form to check the speed of the vehicle descending the grade. This has imposed the necessity upon vehicle designers of providing excessively large brakes, which with the increasing loads now being transported has in some instances restricted the use of compression ignition engines for highway services, and especially in mountainous sections. I have found that the engine itself may be used to serve as a braking means and I accomplish this by interconnecting the fuel injection mechanism with the compression release valve V, whereby when the fuel injection pump is closed or shut off so as to prohibit the supply of fuel to the fuel injection valves, it is possible for the vehicle operator to manually place into operation the compression release valve V by throwing the lever V4 from its closed position to the open position V4b. This is accomplished by a single movement of a common lever at the dash of the vehicle, which lever communicates with the valves V on all of the cylinders of the engine and thereafter as the piston approaches the completion of its outward compression stroke position of each cylinder, the air compressed within each cylinder is forced out through the valve V and its valve seat V1 into the escaping pipes V6 and the work done by the piston, or pistons, in thus compressing and discharging the air through said valve, together with the fact that on its subsequent inward stroke the piston expands the air then residual in each cylinder and produces thereafter a partial vacuum, and if the clutch is left in engagement with the vehicle driving mechanism, the work thus done in compressing and discharging the air charge and thereafter expanding the small quantity of air residual within the cylinder, thereby causing a vacuum, absorbs sufficient energy of the grade descending vehicle, to act as an efficient brake and eliminate the necessity of depending exclusively upon other common braking means to reduce and control the speed of the vehicle in descending grades.

Having thus described my invention, what I claim and desire to secure by Letters Patent, is:

1. The combination of a pair of two stroke cycle, fuel injection, oil engine cylinders, each closed at one end, and having pistons and connecting rods operating therein and attached to a common crankpin, inlet and exhaust gas ports extending through each of the cylinder walls, the inlet ports located in the adjacent cylinder walls and exhaust ports located in the exterior, or outwardly disposed cylinder walls, a common mechanically operated valve having a single aperture operating to time and control the passage of air through both inlet ports and into their respective cylinders.

2. In a pair of single acting, two stroke cycle, fuel injection, oil engine cylinders, having pistons and connecting rods operating therein and attached to a common crankpin, the combination of inlet and exhaust gas ports extending through their respective cylinder walls, the inlet ports located in the adjacent cylinder walls and exhaust ports located in the exterior, or outwardly disposed cylinder walls, and a common, mechanically operated valve arranged to time and control the flow of air through both inlet ports.

3. In a two stroke cycle, compression ignition, oil engine, the combination of: Inlet air and exhaust gas ports, disposed through the wall of the cylinder at or near the plane of the top of the piston when the latter is at its crank end position, means to control the time of admission of a supply of air above atmospheric pressure through said inlet ports; said air inlet ports or passageways being shaped to direct the incoming air upwardly and tangentially into the engine cylinder, a combustion chamber in the head of said engine cylinder and substantially circular in cross section, with its axis at an angle to the major axis of the cylinder, said combustion chamber having two parts, one part stationary and located within the cylinder head, the other part formed by a portion of the top of the piston and which part also serves as a guide to direct the incoming air upwardly into the cylinder, means to direct the air during the compression stroke of the piston, tangentially into the circular cross section combustion chamber.

4. In a fuel injection, oil engine having a pair of cylinders with single acting pistons reciprocating therein and each connected to a common crank pin, the combination of inlet air and exhaust gas ports perforating the cylinder walls, the inlet air ports located in the upper or adjacent walls of the two cylinders and the exhaust gas ports in the opposite walls of the respective cylinders, the lower edges of the ports in each cylinder on a common plane with the top of its piston operating therein when the latter is at, or near, the end of its crankward travel; the upper edges of the inlet air ports, on a plane above the upper edges of its exhaust ports, a tubular air supply pipe common to both cylinders and connected with air ducts to the inlet ports of each cylinder and fitted with a tubular, single aperture valve revolving in unison with the said crank pin; the aperture of the said revolving valve arranged with reference to the ducts leading to the inlet air ports of each cylinder such that the angle of the arc traversed by the leading edge of valve aperture in uncovering each of the air ducts shall be equal to the angle included between the axes of the respective cylinders.

5. In a fuel injection oil engine, having a cylinder closed at one end and fitted with a single acting piston reciprocating therein, the combination of inlet and exhaust gas ports perforating the cylinder wall, with their lower edges approximately in a common plane with the top of the piston when the latter is approximately at the end of its crankward travel, the upper edges of the inlet ports being located on a plane above the upper edges of the exhaust ports, an air supply tube fitted with a single aperture valve geared to rotate at the same rate of speed as the crank pin, the aperture in said valve arranged to open to permit the flow of previously compressed air through the said inlet port after the piston has uncovered the exhaust port on its crankward stroke and the said apertured valve arranged to continue to permit the flow of compressed air through the said inlet port after the piston has closed the exhaust port on its outward or compression stroke, substantially as described.

6. A two-stroke cycle, compression ignition, oil engine of the character described comprising a cylinder having an exhaust port and also having an intake port provided with means to direct a charge of air flowing therethrough tangentially and upwardly into the cylinder, a cylinder head having a combustion chamber of circular cross section, disposed with its major axis at an angle to the major axis of the cylinder and formed with an opening in its wall affording communication between the chamber and the cylinder, said cylinder head also having an upwardly inclined flat wall which merges tangentially into the wall of the combustion chamber at one side of said opening, a piston fitted in the cylinder and controlling the intake and exhaust ports, said piston having a projection extending upwardly from its head, said projection having a concave surface presented to the intake port when the piston is at lower dead center to deflect the charge of air flowing in through said port upwardly in the cylinder, said concave surface being presented to and completing the wall structure of said chamber to close the opening between the combustion chamber and the cylinder when the piston is at upper dead center, said projection also having a flat inclined surface extending downwardly from one boundary of the concave surface to the periphery of the head of the piston, said inclined surface corresponding in its inclination to the inclined surface of the cylinder head and functioning when the piston is at upper dead center to force the charge of air from the cylinder tangentially into the combustion chamber, and means for injecting fuel oil into the combustion chamber when it is closed by said concave surface.

7. A two-stroke cycle, compression ignition, oil engine of the character described comprising a cylinder having an exhaust port and also having an intake port provided with means to direct the charge of air flowing therethrough tangentially around and upward in the cylinder, a cylinder head having a combustion chamber therein disposed with its major axis at an angle to the major axis of the cylinder, said combustion chamber being of circular cross section and having an opening in its wall at the upper end of the cylinder to provide for communication between the cylinder and the combustion chamber, a piston fitted in said cylinder and operable to control said intake and exhaust ports, said piston having a projection on its head formed with a concave surface presented to the intake port when the piston is at low dead center to cause the stream of air flowing in through the intake port to rise upwardly toward the combustion chamber, said concave surface of said projection being presented to the opening of the combustion chamber and complementing the wall structure thereof when the piston is at upper dead center to define with the wall of the chamber a completely enclosed and confined space of circular cross section, said piston and said cylinder head cooperating to force the charge of air from said cylinder tangentially in said combustion chamber prior to its closure by its said concave surface, and means for injecting fuel oil transversely of the said combustion chamber when it is completely closed.

8. A two-stroke cycle, compression ignition, oil engine of the character described comprising a cylinder having intake and exhaust ports, a cylinder head provided with a combustion chamber having an opening in its wall at the upper end of the cylinder affording communication between its interior and the interior of the cylinder, a piston fitted in the cylinder and controlling said intake and exhaust ports, said piston being provided with a projection on its top having a concave surface presented to the intake ports when the piston is at lower dead center to deflect the discharge of air flowing through said ports upwardly in the cylinder, said concave surface of said projection being presented to and closing the opening of the combustion chamber when the piston is at upper dead center to form with the combustion chamber a completely enclosed and confined space of circular cross section for the charge of air, and means for injecting fuel into the combustion chamber when it is completely closed by the concave surface of said projection.

9. A two-stroke cycle, compression ignition, oil engine of the character described comprising a cylinder having an exhaust port and also having an intake port provided with means to cause a charge of air flowing therethrough to enter the cylinder tangentially and swirl around therein about the major axis of the cylinder; a cylinder head having a combustion chamber provided with an opening affording communication between its interior and the interior of the cylinder, and a piston fitted in the cylinder and controlling the intake and exhaust ports and also having means presented to the intake port to cause the tangentially directed charge of air to be deflected upwardly toward the combustion chamber, said means also serving to close the opening between the combustion chamber and the cylinder when the piston is at upper dead center, said piston and said cylinder head cooperating to force the charge of air from the cylinder tangentially into the combustion chamber as the piston approaches upper dead center.

10. A two-stroke cycle, compression ignition, oil engine of the character described comprising a cylinder having an exhaust port and also having an intake port provided with means to cause a charge of air flowing therethrough to enter the cylinder tangentially and swirl around therein about the major axis of the cylinder, a cylinder head having a combustion chamber therein offset from the major axis of the cylinder, said combustion chamber having an opening in its wall providing for free communication between the interior of the chamber and the interior of the cylinder, a piston fitted in said cylinder and operable to control said intake and exhaust ports and also having means presented to said opening and complementing the wall structure of the combustion chamber when the piston is at upper dead center to define with the wall of the combustion chamber a completely enclosed and confined space of circular cross section, said piston and said cylinder head cooperating to force the charge of air from the cylinder tangentially into said combustion chamber, and means for injecting fuel oil transversely of said combustion chamber.

CONSTANTINE LEE STRAUB.